(12) United States Patent
Fenelli et al.

(10) Patent No.: US 7,314,103 B2
(45) Date of Patent: Jan. 1, 2008

(54) RE-LOCATABLE OPERATOR STATION

(75) Inventors: Nicholas Edward Fenelli, Trenton, NJ (US); Donald B. Harris, Arlington, VA (US); Robert Alan Mullowney, Hatboro, PA (US)

(73) Assignee: Airtrax, Inc., Blackwood, NJ (US)

( * ) Notice: Subject to any disclaimer, the term of this patent is extended or adjusted under 35 U.S.C. 154(b) by 43 days.

(21) Appl. No.: 10/647,122

(22) Filed: Aug. 25, 2003

(65) Prior Publication Data

US 2005/0045409 A1  Mar. 3, 2005

(51) Int. Cl.
*B60K 26/00* (2006.01)
(52) U.S. Cl. .................. 180/19.1; 180/334; 280/774
(58) Field of Classification Search ............... 180/326, 180/332, 334, 19.1; 280/774, 775; 74/473.32, 74/473.33, 493, 484 R
See application file for complete search history.

(56) References Cited

U.S. PATENT DOCUMENTS

| | | | | |
|---|---|---|---|---|
| 3,737,003 A | * | 6/1973 | Beals et al. ................... | 180/78 |
| 3,876,255 A | * | 4/1975 | Ilon ........................... | 301/5.23 |
| 4,209,074 A | * | 6/1980 | York .......................... | 180/78 |
| 4,580,647 A | * | 4/1986 | Peifer et al. .................. | 180/78 |
| 6,340,065 B1 | * | 1/2002 | Harris ........................ | 180/7.2 |
| 2006/0090587 A1 | * | 5/2006 | Kanzler et al. ............... | 74/493 |

* cited by examiner

*Primary Examiner*—Anne Marie Boehler
(74) *Attorney, Agent, or Firm*—Pequignot & Myers LLC

(57) ABSTRACT

A re-locatable operator station device designed to be used to control walk-behind or stationary machinery and to be repositioned by an operator while maintaining a constant orientation with respect to the machinery. This means that the X and Y axis of the operating station remains the same as the X and Y axis of the vehicle. Such re-locatable operator station is being suitable for use on machinery such as pallet trucks, long load transporters, aircraft engine handling devices, scissors lifts, and other industrial machinery, especially omni or multi-directional machinery or vehicles, as well as with fixed machines in applications places where the operator cannot or does not remain in a single location or is better served at another location.

21 Claims, 13 Drawing Sheets

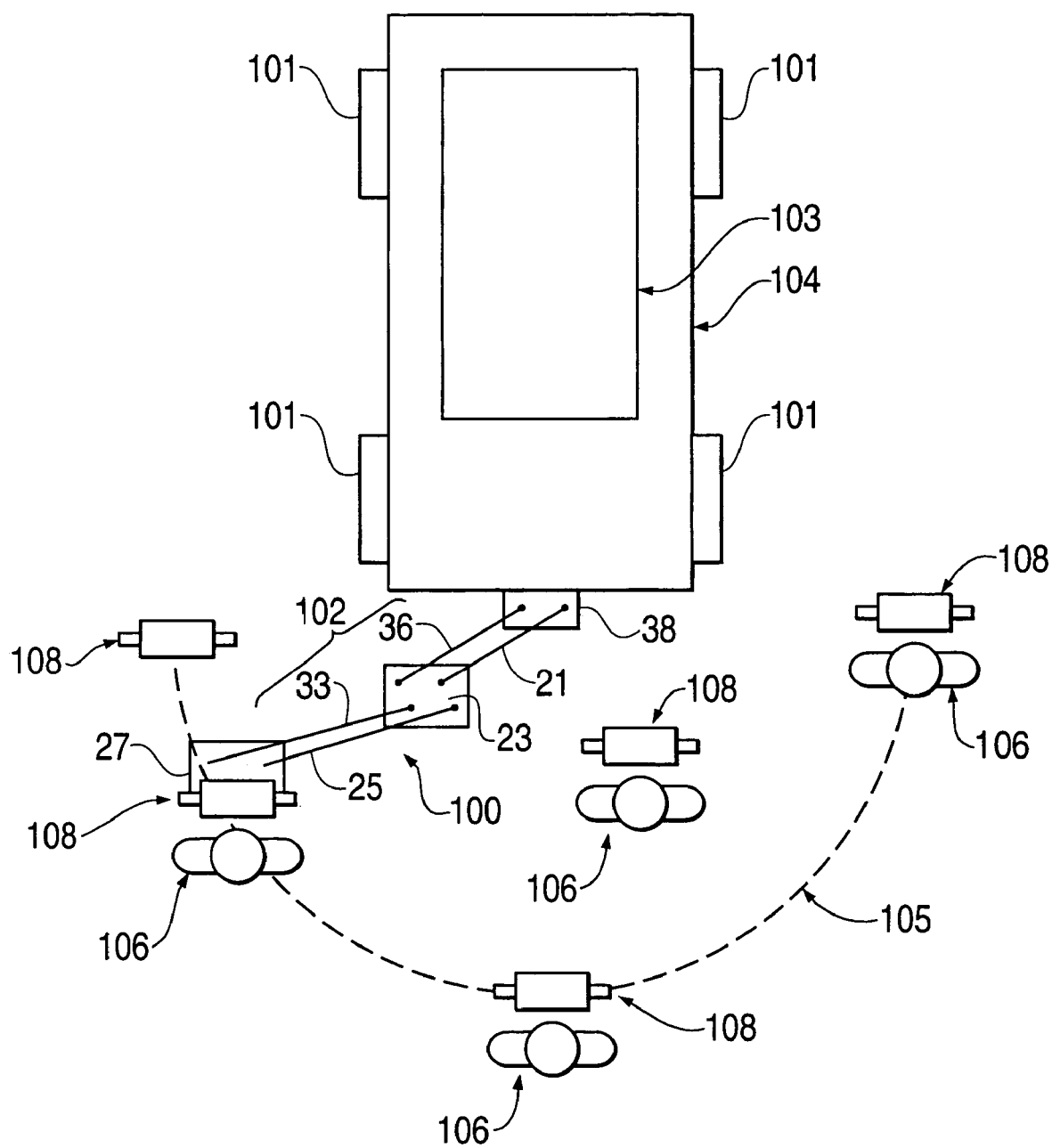

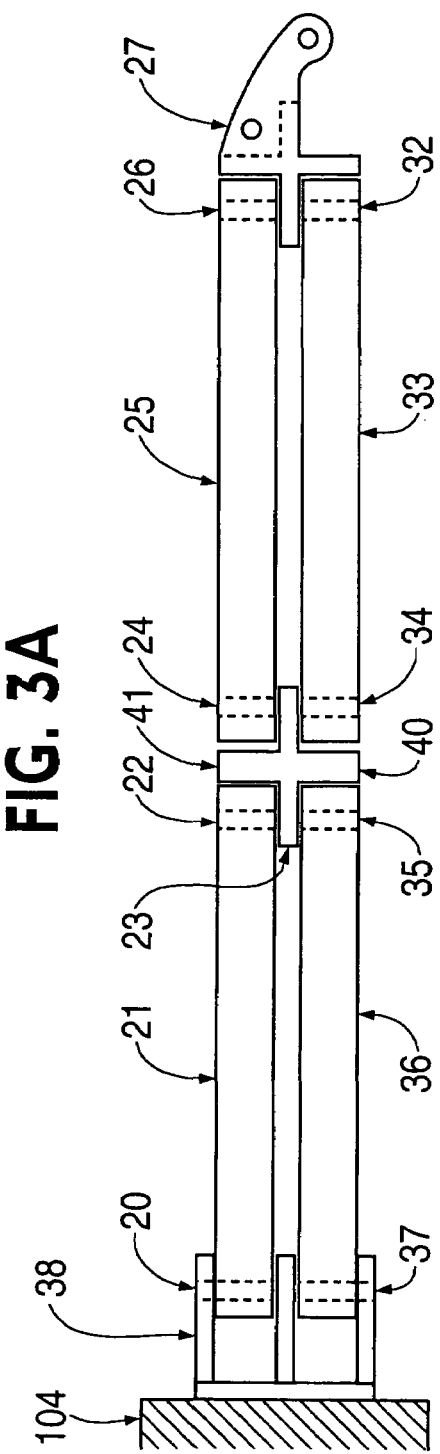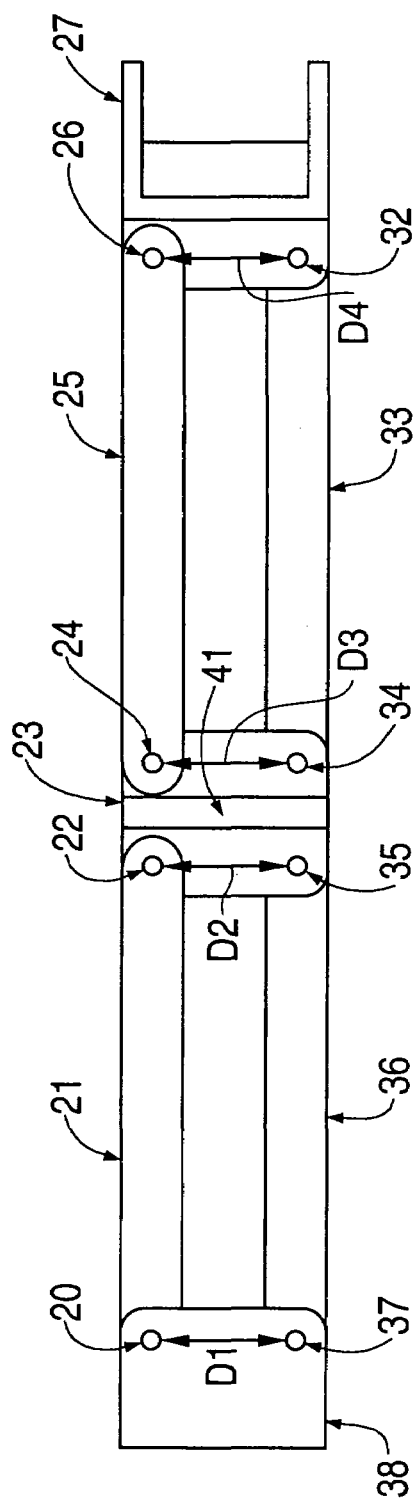

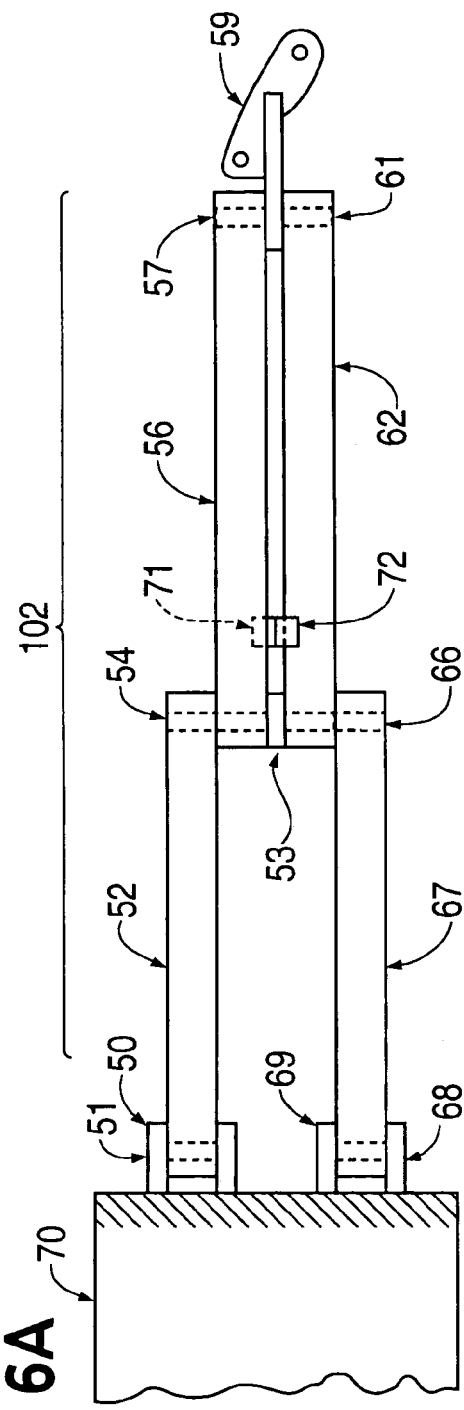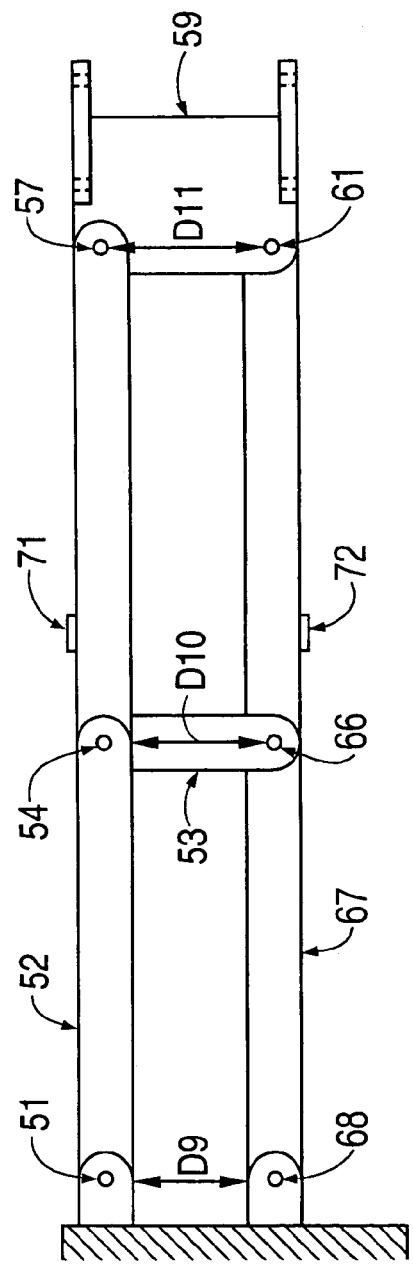
FIG. 6A
FIG. 6B

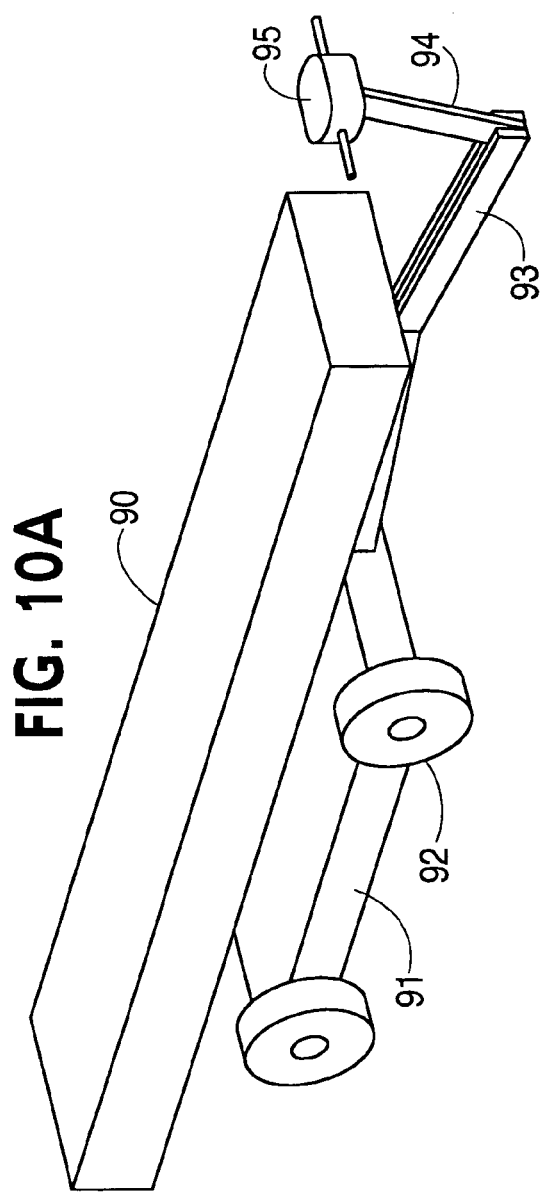
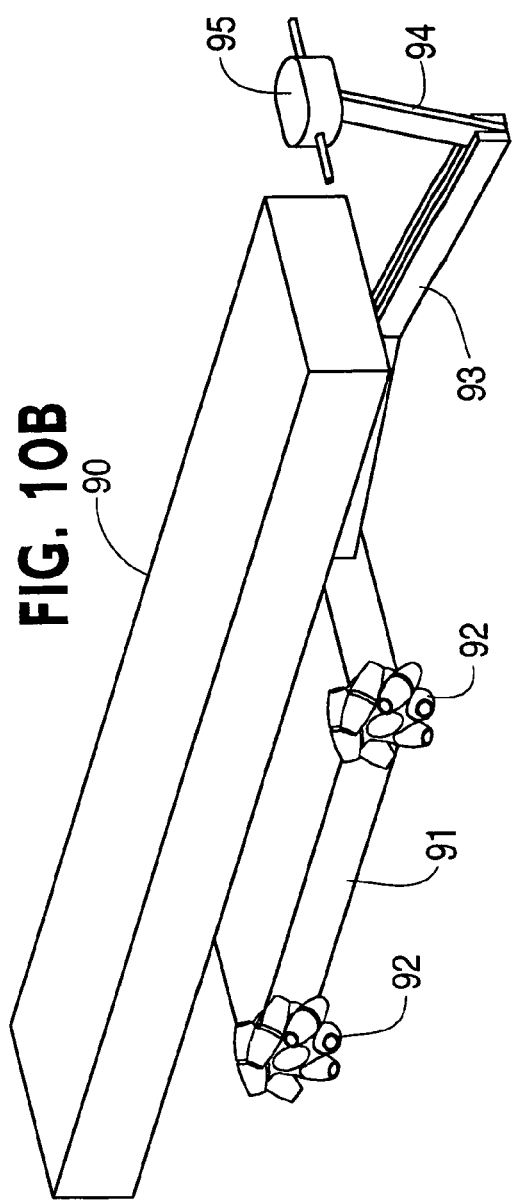
FIG. 10A
FIG. 10B

RE-LOCATABLE OPERATOR STATION

CROSS-REFERENCE TO RELATED PATENT APPLICATIONS

None.

BACKGROUND OF THE INVENTION

The present invention relates generally to the field of operator controls for remotely controlled vehicles, and more particularly to a controller designed to be used to control walk-behind, stationary, or ride-on machinery such as pallet trucks, long load transporters, aircraft engine handling devices, scissors lifts, especially omni or multi-directional vehicles or machinery and other industrial machinery.

Walk-behind, remote controlled, and other machines have used various means to convey operator commands to the machine. Some machines have been constructed with either tethered or wireless controls. A tethered control will generally consist of an enclosure to be held by or strapped to an operator. The control enclosure will typically have a "dead man" or enable switch or button, a joy stick or other velocity command input device, mission hardware control input devices such as buttons, toggle switches, one, two, or three axis joy sticks, six-axis force input devices such as a "space ball" or other devices to control embarked machinery and systems, and perhaps an emergency stop button.

Tethered systems are always at risk of the vehicle running over the tether or fouling it on other obstructions. The tether may become entangled in one of the wheels or other moving component and broken, necessitating the machine to be taken out of service.

Tethered systems have the disadvantage that the tethers are relatively delicate and can become damaged by personnel stepping on them, or chafed from being dragged on the ground. Strain relief is another issue, and continual flexing can cause the interconnecting wiring to fatigue and break, potentially resulting in loss of control.

Wireless control systems have also been developed where the operator is equipped with a command input device that is held by the operator while in use. The wireless command input device can also be suspended from a belt or suspenders. Industrial wireless systems can function in most industrial environments, but are not able to function in some military electromagnetic environments, in particular where radars or other high power electromagnetic radiating devices are in use. Wireless systems also emit radio frequency (RF) energy that can interfere with weapons and communication systems in a military environment.

Both tethered and wireless systems have the disadvantage of not conveying the machine's motion directly to the operator via tactile feedback. This is most detrimental when making small, precise motions in constricted environments where an error could damage delicate equipment or injure nearby personnel. An operator that has tactile feel for the machine's motion will be less likely to cause damage in such situations.

Machines controlled via tethered or wireless links can be turned in a direction wherein the front of the machine differs in orientation from the face of the operator, and in such an orientation the operator may become confused and inadvertently command the machine in a direction different from that desired, causing frustration or accidents. This refers, more specifically, to the X and Y axis of the operating station remaining the same as the X and Y axis of the vehicle. In emergency situations this potential for operator confusion or disorientation relative to the front of the machine and hence the direction of travel can be particularly dangerous, since an operator's initial instinctive reaction may be different than that needed to avoid a collision or bystander.

Many industrial and military machines have been equipped with a rigid operator interface. In some cases, as in a commercial powered pallet handler device, the operator interface may take the form of a "T" shaped handle with finger operated paddle controls. The paddle controls may be used to convey velocity commands and or lift and tilt or other commands as appropriate.

Sometimes such operator interfaces are arranged to rotate with the steered wheels, and in some cases, the operator's physical input is used as the steering actuation force. For example, the US Navy MHU191 weapons handler dolly is equipped with an extendable handle that is linked to the front wheels. An operator will rotate the handle about the front of the vehicle to the desired direction to turn and then either push or pull on the handle or other part of the payload or dolly to move it in that direction. Centering the MHU191 dolly handle will cause the MHU191 dolly to move in a straight path when pushed. In another example, a electrically powered pallet jack can have a "T" shaped handle that is connected to powered wheels which are further arranged to support one end of the machine. In order to change the machine's direction of travel, the operator manually rotates the "T" handle about the powered wheels, thereby orienting them into the desired direction.

The aforementioned arrangements have the disadvantage that the operator's juxtaposition to the machine is fixed. That is, the operator must be located centrally behind the machine while traveling a straight path, or to the side of the machine facing the inside of the turn while traveling on a curved path. The operator is not able to, for instance, view the side of the machine facing the outside of a turn, or to walk from a vantage point far to one side of the machine while traveling in a straight path.

Therefore, there exists a need for an operator interface that provides tactile feedback to the operator. There also exists a need for a walk behind machine operator interface that permits the operator to walk from different vantage points while the machine is in motion and under control. There also is a need for an operator interface that provides tactile feedback and that can be relocated all while maintaining a constant rotational geometry about the vertical axis.

SUMMARY OF THE INVENTION

The invention provides a re-locatable or moveable operator station device designed to be used to control walk-behind or stationary machinery and to be able to be repositioned by an operator while maintaining a constant orientation with respect to the front or face of the machinery. This refers to the X and Y axis of the operating station remaining the same as the X and Y axis of the vehicle.

The re-locatable operator station is suitable for use on machinery such as pallet trucks, long or short load transporters, military munitions handlers, aircraft engine handling devices, scissors lifts, and other industrial machinery, as well as with fixed machines in applications where the operator cannot remain in a single location or is better served by being permitted to relocate without losing orientation with respect to the front or face of the machine. This is especially prevalent with the use of omni or multi-directional vehicles or machinery.

BRIEF DESCRIPTION OF THE DRAWINGS

FIG. 2 shows a bird's eye view of a vehicle equipped with an embodiment of the present invention depicting the range of operator station locations.

FIGS. 3A and 3B show a detail of a first embodiment of the invention.

FIGS. 6A and 6B show a detail of a second embodiment of the present invention.

FIGS. 10A and 10B depict a long load transporter equipped with an embodiment of the invention.

DETAILED DESCRIPTION OF THE PREFERRED EMBODIMENTS

Figure 1A:
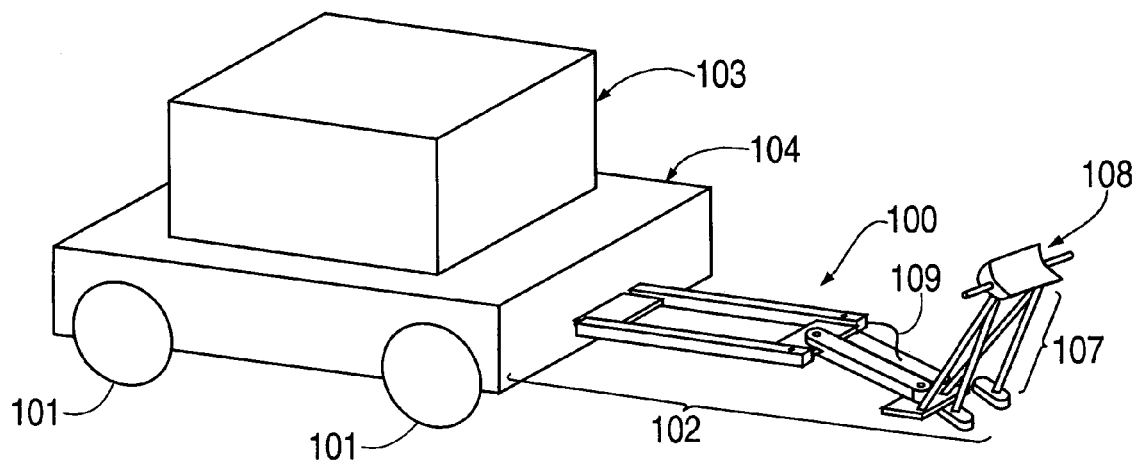
FIG. 1A depicts a vehicle equipped with an embodiment of the present invention.

A re-locatable operator station comprises one or more stages of fixed or extendable length that couple an operator interface to the vehicle being operated. Each of the various stages is connected to the next by a hinged joint that enables a limited range of motion. The hinged joints between each stage exhibit a reluctance to movement, such as provided by friction bearings, such that the stages will remain in a fixed orientation during normal walk behind operation, but the operator is able to relocate or reorient the operator interface when desired by applying force to the interface.

The operator interface includes controller devices that may be arranged so as to present to an operator all of the man-machine interfaces, which are the devices necessary to enable a human operator to monitor and control all vehicle functions. Such man-machine interfaces may include controller devices such as any suitable means of receiving an operator's input, including switches, paddles, buttons, touch screens, hand-, finger-, or wrist-actuated single- or multi-axis joy sticks that create command signals in proportion to an operator's manual displacement or force applied; voice recognition microphones, or other input devices. The man-machine interfaces on the operator interface may also contain machine status indicators or feedback devices that communicate to the operator the machine's status, such as power source condition, machine status, visible or audible cautions or warnings. These may take the form of gages, digital readouts, liquid crystal displays, light emitting diodes, lamps, cathode ray tube displays, vibration or force-feedback mechanisms included in a controller device (e.g., as a joy stick with force-feedback capability) or other means to convey data or information to the operator.

The operator interface may be held or positioned by the supporting structure at an appropriate height for the operator. The height may be adjustable within the range of typical operator statures, or within a range of operator positions. The operator interface may be held at a convenient angle to the horizontal that is appropriate to minimize the likelihood of a repetitive motion injury.

The operator interface supporting structure may also be configured and arranged so that it can be lowered. A linkage may be arranged between the supporting structure and the operator interface such that the operator interface will rotate towards the vertical as it is lowered, thereby preserving the spatial orientation or angular relationship between the operator's hands and the interface. The ability to temporarily lower the operator interface enables operation of the machine underneath obstructions that would preclude use of a machine with a fixed-height operator's interface. This mode of operation may be used only temporarily and infrequently, and it is recognized that continued use of the machine with the operator interface lowered near the ground is unlikely in most applications of the present invention.

Figure 1B:
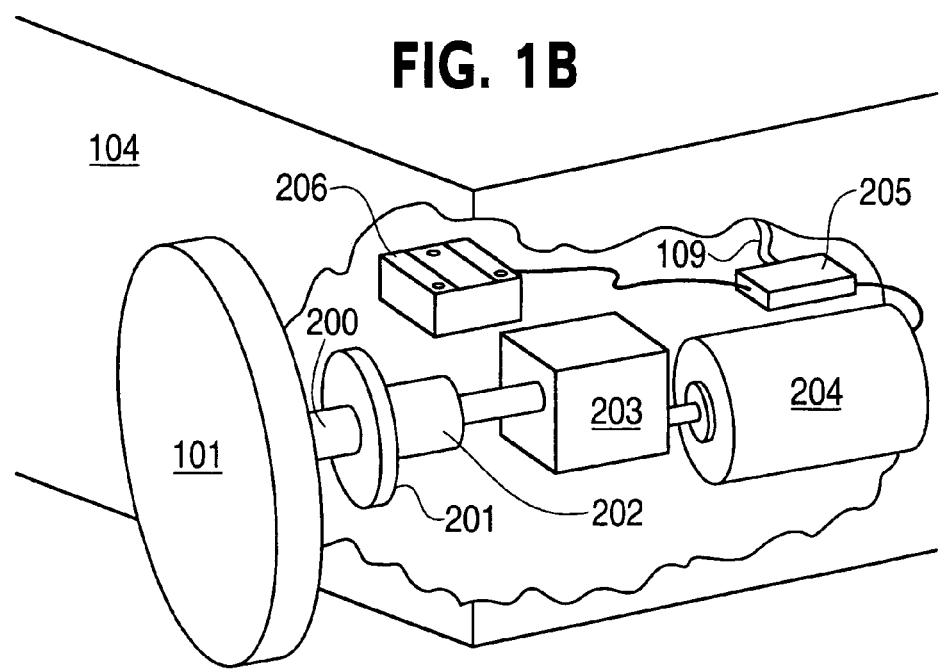
FIG. 1B is a detail view of a portion of the vehicle depicted in FIG. 1A.

Referring to FIGS. 1A and 1B, a wheeled vehicle comprises a chassis 104, at least three wheels 101 rotateably connected to the chassis and arranged to support the same. Each wheel 101 is connected to a drive train shown in FIG. 1B comprising a drive shaft 200, a support bearing 202, a motor 204, a speed reducer 203, which may be a gear train or a belt and pulley assembly, and electronic controls 205. Electrical energy to power the vehicle drive and mission hardware is supplied by a suitable source of power 206, such as a battery, fuel cell, fossil fuel powered electrical generator, hybrid power supply module as disclosed in U.S. patent application Ser. No. 09/827,173, or any combination thereof. If employed on the vehicle, a brake assembly 201 may also be part of the drive train or may be applied to one or more of the wheels directly.

Mission hardware 103 is supported by the chassis 104 and could include a raiseable payload platform, forklift mechanism, scissors lift, weapons loader, aircraft engine handling system, specialty load handling device, sensor package, fire fighting equipment, or inspection device. The mission hardware 103 may also include the mechanical, hydraulic and/or electrical actuator systems necessary to lift, lower and position a payload platform or positioner.

The re-locatable operator station 100 comprises three main components: the horizontal linkage assembly 102, the vertical linkage assembly 107, and the operator control station 108. Also included within the re-locatable operator station 100 are electrical cables 109 that electronically couple the operator station 108 to the vehicle 104 and/or to the electronic controls 205 therein. Such electrical cables 109 may be threaded at least partially through the structures that make up the horizontal and vertical linkages 102, 107. The horizontal linkage assembly 102 is connected to one side of the vehicle chassis 104 in a suitable manner such as by being bolted to a flange or bracket as shown. The vertical linkage assembly 107 is connected at or near to the outboard end of the horizontal linkage assembly 102. The operator control station 108 in turn is connected to the top of the vertical linkage assembly 107. The re-locatable operator station comprising horizontal linkage assembly 102, vertical linkage assembly 107, and operator station 108 is arranged such that an operator can walk along with the vehicle chassis 104 while controlling its drive system and mission hardware 103. In an alternative embodiment of the present invention, the vertical linkage assembly 107 is connected to the vehicle chassis 104 and the horizontal linkage assembly 102 is connected at one end to the top of the vertical linkage assembly 107 and at the end to the operator control station

108. References to horizontal herein mean substantially horizontal with respect to a ground surface such as a floor, roadway, pedestal or any surface on which the operator and/or the machine or vehicle may stand. References to vertical linkage assemblies and vertical links herein mean a linkage that is capable of being oriented other than horizontally. However, as explained herein, a vertical linkage assembly may be positioned at any angle with respect to a ground surface ranging from substantially horizontal to vertical (i.e., perpendicular to horizontal). Thus, a vertical linkage assembly may be capable of being positioned substantially horizontally with respect to a ground surface.

Referring to FIG. 2, a vehicle, comprising a chassis 104 supported by wheels 101 and equipped with mission hardware 103 as described in the preceding paragraph, is equipped with the re-locatable operator station 100. The range in locations 105 from which an operator 106 can position the operator control station 108 and control the vehicle is depicted. The embodiment of this invention shown in FIG. 2 permits the operator control station 108 to remain in the same orientation with respect to the vehicle chassis 104, no matter where it is positioned within the permissible range. This feature of the illustrated embodiment may be particularly important when the vehicle 104 being controlled is an omni-directional machine (i.e., the wheels 101 comprise omni-wheels such as disclosed in U.S. Pat. Nos. 3,876,255 or 6,340,065) since this will help to ensure that the operator does not become disoriented.

FIG. 3A and FIG. 3B show details of the horizontal linkage 102 of the re-locatable operator station 100 presented in FIG. 1A and FIG. 2. The horizontal linkage 102 is composed of two or more sets of four bar links 21, 25, 33, 36 that form parallelograms when viewed from above as illustrated in FIGS. 2 and 3B. Bracket 38 is connected to the host vehicle chassis 104 shown in FIG. 1A, by suitable attachment structure including, for example, welds, bolts, screws, pins, quick disconnect assemblies, clevis connections, or adhesives. The connection between bracket 38 and chassis 104 should have sufficient strength and stiffness to support the rest of the re-locatable operator station 100, including all forces imparted by the operator while controlling the machine and repositioning the operator interface 108. An upper pivot 20 and lower pivot 37 protrude vertically from the bracket 38. Two approximately equal length links 21, 36 are rotateably connected to pivots 20 and 37. More preferably, the two links 21, 36 are of equal length. An upper link 21 is connected to pivot 20 and a lower link is connected to the lower pivot 37. The pivots 20 and 37 may each be equipped with anti-friction elements (not shown) that could take the form of tapered roller bearings, angular contact ball bearings, full complement rod end ball bearings, or sliding contact bearings formed of plastic such as delrin, reinforced plastic such as glass filled nylon, metals such as bronze, or Teflon® coated or impregnated bushings. The anti-friction elements serve to permit easy rotation of both upper 21 and lower 36 links about vertical axes centered on pivots 20 and 37, respectively. Alternatively, pivots 20 and 37 (as well as some or all pivots described herein) may be equipped with a friction element that is capable of preventing or limiting rotation about the pivot when subjected to a rotational force below a set threshold and permitting rotation about the pivot when subjected to a rotational force at or above that threshold. The friction elements may be adjustable, such as by a thread-actuated clamp that permits adjusting the force applied between two breaking surfaces, so that the rotation-force threshold can be adjusted within some range. Such friction elements may be set to hold the operator station in a fixed orientation until the operator applies sufficient force to the operator station to overcome the friction threshold and thereby reposition the operator station to a new orientation.

The outboard ends of links 21 and 36 are rotateably connected to an intermediate bracket 23 on vertically oriented pivots 22 and 35, respectively. Pivots 35 and 22 are separated by a distance D1. As described above for pivots 20 and 37, pivots 22 and 35 may be fitted with anti-friction elements (not shown), such as those listed above, to enable low friction rotation of links 21 and 36 about pivots 22 and 35. Intermediate bracket 23 is fitted with physical stops 40 and 41 that constrain the total permissible rotation of links 21 and 36 about pivots 22 and 35 to less than approximately 180 degrees. More preferably, the total permissible rotation of links 21 and 36 about pivots 22 and 35 is less than 180 degrees.

Pivots 35 and 22 are separated by a horizontal distance D2 equivalent (within reasonable tolerances) to the horizontal distance D1 separating pivots 20 and 37. As such, when links 21 and 36 are assembled to brackets 38 and 23 by way of pivots 20, 37, 22, and 35, brackets 38 and 23 are constrained to remain parallel to each other, but permitted to rotate relative to one another within the 180 degree constraint described above.

The outboard end of intermediate bracket 23 is fitted with two vertically oriented pivots 34, 24 mounted below (pivot 34) and above (pivot 24) the bracket 23. Two links 25, 33 of approximately equivalent length are rotateably connected to pivots 24 and 34. More preferably, the two links 25, 33 are of equal length. Similar to the other pivots described above, pivots 34 and 24 may be fitted with antifriction elements (not shown), such as those listed above. One link 33 is connected to the lower pivot 34 and the other link 25 is connected to the upper pivot 24. Intermediate bracket 23 is fitted with physical stops 40 and 41 that constrain the rotation of links 25 and 33 to a maximum rotation about their pivots 24 and 34 to less than 180 degrees. More preferably, the maximum rotation of links 25, 33 about pivots 24, 34 is less than 180 degrees. Pivots 24 and 34 are separated by a distance D3.

An outboard bracket 27 is fitted with two pivots 32, 26, one protruding from the bottom (pivot 32) and one from the top (pivot 26). The outboard end of link 25 is rotateably connected to the upper pivot 26 and the outboard end of link 33 is rotateably connected to the lower pivot 32. Alternatively, link 25 could be coupled to lower pivots on brackets 23 and 26, if link 33 is coupled to upper pivots on brackets 23 and 26. The horizontal separation distance D4 between pivots 26 and 32 on the outboard bracket 27 is equal (within reasonable tolerances) to the horizontal separation distance D3 between pivots 24 and 34 on the intermediate bracket 23. As such, when links 25 and 33 are assembled to brackets 23 and 27 by way of pivots 24, 34, 26, and 32, brackets 23 and 27 are constrained to remain parallel to each other, but permitted to rotate relative to one another within the less than 180 degree constraint described above.

When the aforementioned links 21 and 36 are simultaneously connected to appropriate pivots on brackets 38 and 23, the outboard bracket 27 is constrained to be parallel to the inboard bracket 38. The inboard bracket 38 is rigidly affixed to the host vehicle chassis 104 (see FIG. 1), therefore the outboard bracket 27 can be relocated relative to the vehicle chassis 104 but is constrained in height, yaw, pitch or roll relative to the chassis 104.

The pivots 20 and 37 must be of sufficient strength to support the entire re-locatable operator station 100 system of brackets, linkages, and pivots. Forces that must be resisted include the weight of the links, operator control station, any force applied by the operator, and forces caused by contact with the operating environment. Since the links 21 and 36 are parallel to each other, both shear and moment produced by the aforementioned loads must be resisted by the pivots 20 and 37. The above described antifriction features (not shown) and incorporated into the pivots 20 and 37 must resist the same weight and moments.

The two stage linkage mechanism for the re-locatable operator station 100 described above is only one example embodiment of the invention. It will be clear to those skilled in the relevant art that the two stage re-locatable operator station described above can be extended to three or more stages by simply adding more intermediate brackets and links in the manner and configurations described above.

Figure 4A:
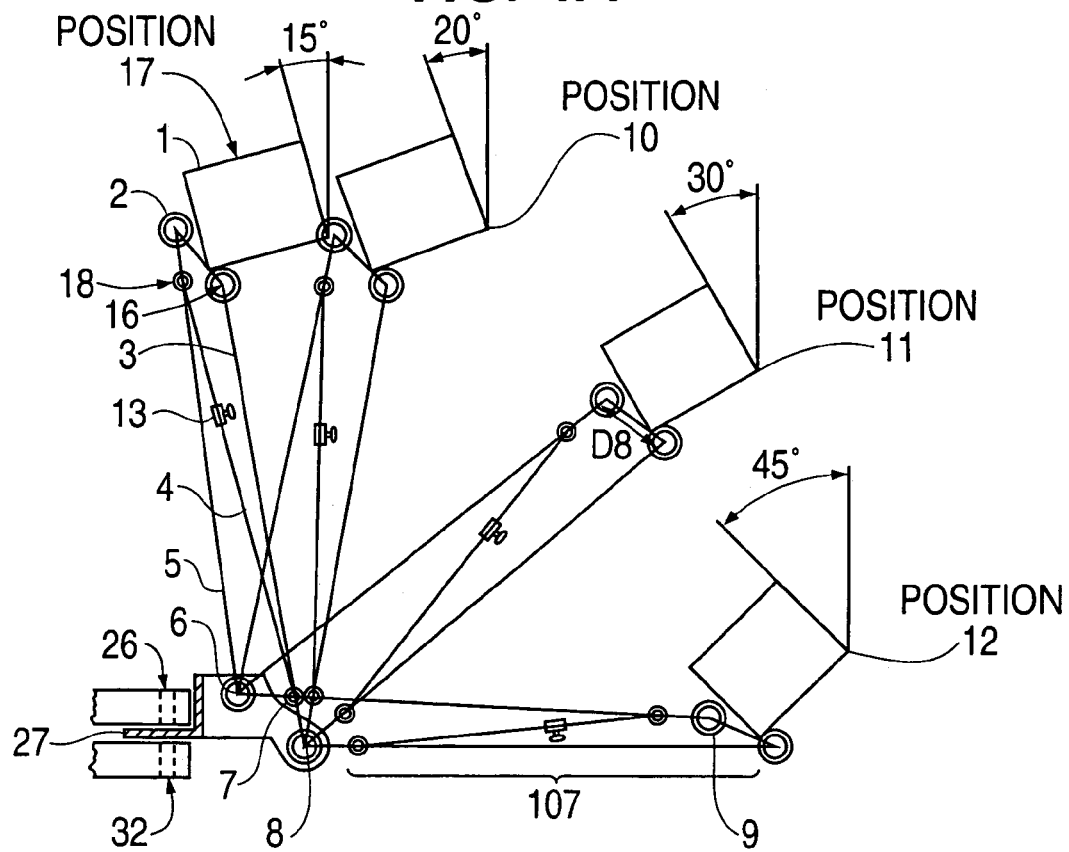
FIGS. 4A and 4B show details of a vertical linkage.
Figure 4B:
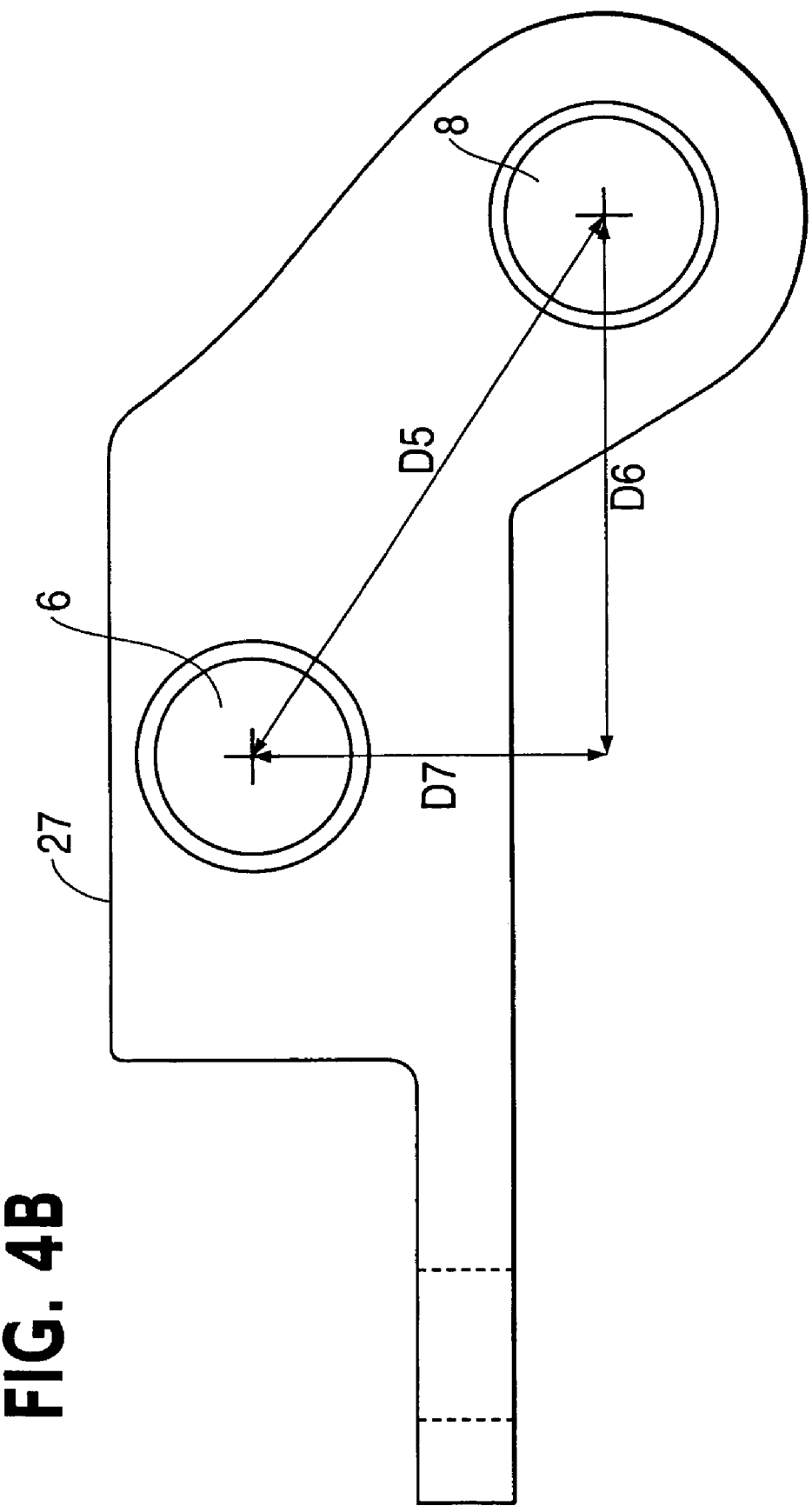

FIG. 4 shows a detailed depiction of the vertical linkage. The outboard bracket 27 is fitted with two horizontally oriented pivots 6 and 8. Pivots 6 and 8 have their centerlines parallel to the plane formed by the two vertical pivots 26 and 32, and are also integral with the outboard bracket 27. Pivots 6 and 8 are parallel and separated from each other by distance D5 made up of a horizontal distance component D6 and a vertical distance component D7 as shown in FIG. 4B. Links 5 and 3 are rotateably connected to pivots 6 and 8. In a preferred embodiment, links 5 and 3 are of equivalent length.

An operator control station 1 is fitted with pivots 2 and 16 as shown in FIG. 4A. The centerlines of pivots 2 and 16 are parallel to each other. Pivots 2 and 16 are separated by a distance D8 that is smaller than the distance D5 that separates pivots 6 and 8. Links 5 and 3 are rotateably connected to pivots 2 and 16 and as such form a linkage that enables the operator control station 1 to be rotated about the outboard bracket 27 over a range of positions, from just past vertical, position 17, to partially lowered, positions 10 and 11, to fully lowered, position 12. The arrangements of pivots 6, 8, 2 and 16 are such that the operator control station 1 rotates in a direction opposite to that of the linkage over the range of motion from positions 17 to 12. This opposite rotation causes the operator control station 1 to be presented at an ergonomically convenient angle to the operator throughout the range of motion of the vertical linkage.

In one or more embodiments of the invention, a third linkage, link 4, is rotateably connected to link 5 and to link 3 with pivots 18 and 7. In one or more embodiments, link 4 is connected to link 5 at rotateable connection point 18 intermediate between the pivots 6 and 2. Link 4 may be variable in length, such as concentric tubes of different diameter fitted one inside the other, and fitted with an operator controlled locking mechanism 13. When the link 4 locking mechanism 13 is engaged, thereby fixing the length of link 4, rotation of the operator station 1 about pivots 6 and 8 is prevented, thereby fixing its height and angle to the vertical. When the link 4 locking mechanism 13 is released, thereby allowing link 4 to vary in length, the operator control station 1 can be raised or lowered by the application of manual force to raise the operator control station 1 to position 17, or to lower it to position 12 or anywhere in between. The locking mechanism 13 may be any form of latch, clamp or pin assembly, such as a sleeve-and-set screw assembly as shown in FIG. 4.

In another preferred embodiment, link 5 is fitted with a band or disk brake (not shown). Such a brake would consist of rotating elements rigidly connected to link 5 or link 3 or both link 5 and 3 and static elements rigidly connected to the outboard bracket 13 in the area of the pivot. Alternatively, the static elements could be positioned on the link 5, 3 and the rotating elements on the bracket 13. Such static and rotating elements of a brake assembly are well known to those skilled in the art. In a preferred embodiment, the brake would have a spring loaded braking feature with a manually actuated release. The release would be actuated by the operator when he or she desires to alter the height of the operator control station 1.

In another embodiment, link 5 or link 3 is fitted with a rack and pawl mechanism (not shown) that would comprise a sector of a solid round disk centered on pivot 6 or 8 with teeth formed into its periphery. The sector would be rigidly connected to link 5 if centered on pivot 6 and link 3 if centered on pivot 8, and would rotate with the respective link. A spring loaded pawl is rotateably connected to the outboard bracket 13 that is arranged to engage the teeth in the solid disk. Alternatively, the spring loaded pawl could be connected to the link 5, 3 and the sector connected to the bracket 13. A release mechanism may take the form of a foot or hand actuated lever that will temporarily move the pawl clear of the teeth and enable the operator control station 1 to be repositioned. In this embodiment, the operator control station 1 can be positioned at any one of several discrete heights commensurate with the gear teeth pitch and number.

In any of the foregoing embodiments, the links 5 and 3 are arranged to rotate about their respective pivots and are rigidly prevented from rotating about any other axis, such as by a cylindrical pivot assembly. As such, forces applied at the operator control 1 in a direction normal to the plane of rotation created by rotating links 3 and 5 about pivots 6 and 8 are transmitted to the outboard bracket 13 with little deflection of the vertical linkage 107.

Figure 5:
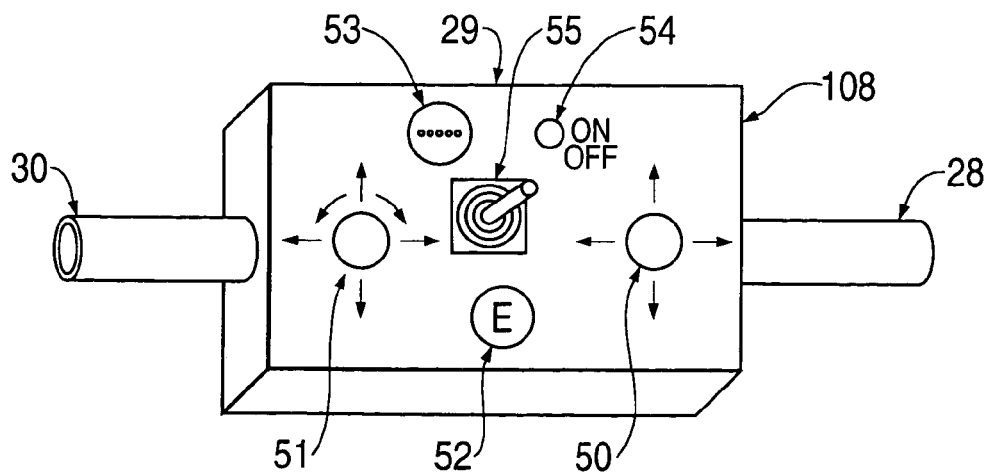
FIG. 5. shows a detail of an operator interface.

A detailed view of the operator control station 108 is presented in FIG. 5. The operator control station 108 comprises an enclosure 29 housing linkages, electronics and wiring not shown. The side of the control station 108 enclosure 29 facing the operator is equipped with appropriate indicator and control devices, such as an energy status indicator 53, an on/off switch 54, an emergency stop button 52, mission hardware controls 55, and vehicle motion controls 50, 51. Handles 28, 30 may be rigidly fixed to the sides of the control station enclosure 29 and arranged to permit simultaneous operation of vehicle motion controls 50, 51.

An energy status indicator 53 may convey the battery charge level, in the case of a battery-powered machine, or a fuel level, in the case of a fossil fuel-powered machine. In one embodiment, the energy status indicator 53 will have a warning feature to advise the operator that the energy level is below some predetermined threshold.

The on/off switch 54 is used to switch the machine from off to standby, to fully operational status. The on/off switch 54 may comprise a keyed multi position rotary switch. In another embodiment the on/off switch 54 comprises a rotary switch. In yet another embodiment the on/off switch 54 comprises a push button switch.

The emergency stop button 52 is arranged to stop the vehicle by disconnecting all power from the drive wheels 101 and mission hardware (103 in FIG. 1) and setting all wheel brakes 201. The emergency stop button 52 may be a mushroom shaped button that is configured to latch in the depressed position after being actuated and requiring that the operator twist the button to release it in order to restore machine function.

Mission hardware controls 55 may consist of a two-axis joy stick arranged to accept proportional control inputs from the operator. In another embodiment of the invention, the mission hardware controls take the form of two or more joy sticks and several discrete switches.

In an embodiment, thumb actuated joy sticks 51 and 50 are used to convey velocity and steering commands to the vehicle, respectively. In another embodiment, joy sticks 50 and 51 convey velocity and steering commands to the vehicle, respectively. In still another embodiment, either joy stick can be arranged to accept both velocity and steering commands to permit one handed operation.

In another embodiment, the vehicle may be an omni-directional machine employing omni-directional wheels such as disclosed in U.S. Pat. Nos. 6,340,065, 3,876,255, and/or 5,374,879. In such an embodiment, vehicle motion controls 50 and 51 consist of thumb actuated joy sticks. Vehicle motion control thumb actuated joy stick 50 is arranged to accept longitudinal and transverse velocity commands from the operator, while vehicle motion control thumb actuated joy stick 51 accepts vehicle yaw rate commands from the operator. Using both the two vehicle motion control thumb actuated joy sticks 50, 51 the operator has complete control of the vehicle's motion. The vehicle motion control thumb actuated joy stick 50 is located in such a manner that the operator can grasp the handle 28 with four fingers of his or her right hand while the thumb rests comfortably on the joy stick 50. Similarly, joy stick 51 is located in such a manner that the operator can grasp the handle 30 with four fingers of his or her left hand while the thumb rests comfortably on the joy stick 51. In this way, the operator receives continuous tactile feed back on the vehicle's orientation and velocity. This arrangement also enables the operator to reposition the re-locatable operator station mechanism 102 by exerting a horizontal force on the handles 30 and 28 while simultaneously maintaining control over the vehicle via the vehicle motion control thumb actuated joy sticks 50 and 51. Thus, it is possible to seamlessly operate the vehicle while simultaneously altering the position of the operator control station 108 with respect to the vehicle chassis 104.

In another embodiment of the invention, the operator inputs yaw and longitudinal velocity commands, which are conveyed to the machine's central controller (not shown), via thumb operated joy stick 50 and transverse velocity commands via thumb operated joy stick 51. In this configuration, an operator is able to maneuver the vehicle with only one hand, having control of yaw rate and longitudinal velocity via thumb operated joy stick 50, and can transit in reverse with just his or her right hand grasping handle actuating thumb actuated joy stick 50, thus enabling the operator to face away from the vehicle and walk forward while the vehicle is operated in reverse. Having one hand firmly grasping the handle 28 will provide continuous tactile feedback to the operator on the machine's motion.

Referring to FIG. 1, the control station 108 is linked electrically to the vehicle chassis 104 via wiring 109 that is run from the operator control station enclosure 29, down the vertical linkage assembly 107, along or inside the horizontal linkage assembly 102, and into the vehicle chassis interior 104. Operator commands pass from the control station 108 via the above described wiring 109 to the central controller (not shown) within the vehicle chassis 104, and electrical power and feedback data from the vehicle central controller (not shown) pass via the above described wiring 109 to the control station 108 to operate displays such as the energy status indicator 53. In another embodiment, the control station 108 is linked to the vehicle control computer via a wireless link. The wireless link may be any suitable form of wireless communication link comprising a transmitter and receiver means of communicating information and a modem, including well known data links, such as a radio frequency (e.g., two-way radio) link, an infrared link, and/or an ultrasonic link. In such an embodiment the control station 108 is powered by a rechargeable battery (not shown).

Another embodiment of the horizontal linkage assembly 102 portion of the invention is presented in FIG. 6A and FIG. 6B. This embodiment comprises a set of two four-bar link assemblies that form parallelograms when viewed from above. This embodiment of the re-locatable operator station is connected to the host vehicle 70 with clevis connections 50 and 69 which couple to the horizontal linkage assembly 102. Clevis 50 and 69 may be connected to the host vehicle 70 using suitable structure such as welds, bolts, screws, or adhesives, or may be integrally cast into the host vehicle 70 structure. The connection between clevis 50 and 69 and the host vehicle chassis 70 has sufficient strength and stiffness to support the rest of the re-locatable operator station 100, including all forces imparted by the operator while controlling the machine.

Links 52 and 67 are of approximately equal length and are connected to clevis 50 and 69 with pivots 51 and 68. Pivots 51 and 68 may each be equipped with anti-friction elements (not shown) that could take the form of tapered roller bearings, angular contact ball bearings, full complement rod end ball bearings, or sliding contact bearings formed of plastic such as delrin, reinforced plastic such as glass filled nylon, metals such as bronze, or Teflon® coated or impregnated bushings. The anti-friction element serves to permit easy rotation of both upper 52 and lower 67 links about vertical axes centered on pivots 51 and 68 respectively.

The outboard ends of links 52 and 67 are rotateably connected to the intermediate bracket 53 on vertically oriented pivots 54 and 66 respectively. As described above for pivots 51 and 68, pivots 54 and 66 may be fitted with anti-friction elements (not shown), such as those listed above, to enable low friction rotation of links 52 and 67 about pivots 54 and 66, respectively circulating.

The relative positions and configurations of host vehicle 70, pivots 51 and 68, and links 52 and 67 is such that the total rotation of links 52 and 67 is constrained to a total of approximately 180 degrees, or plus or minus approximately 90 degrees to either side of the clevis 50 and 69 mounting location.

Pivots 51 and 68 are separated by a horizontal distance D9 that is equal (within reasonable tolerances) to the horizontal distance D10 separating pivots 54 and 66. As such, when links 52 and 67 are assembled to clevis 50 and 69 and intermediate bracket 53 by way of pivots 51, 68, 54, and 66, intermediate bracket 53 is constrained to remain parallel to the plane in which pivots 51 and 68 lie, but is permitted to rotate relative to one another within the 180 degree constraint described above. Pivots 54, 56 may comprise posts extending from bracket 53, pins that pass through bracket 53 (either rigidly attached to or freely rotating within bracket 53), posts extending from one or more of the links 52, 56, 62, 67 into a receiving hole in bracket 53, or a similar suitable structure.

Links 56 and 62 are rotateably connected to intermediate bracket 53 pivots 54 and 66 and to the outboard bracket 59 at pivots 57 and 61. As described above for pivots 51 and 68, pivots 54 and 66 may be fitted with anti friction elements (not shown) to enable low friction rotation of links 56 and 62 about pivots 54 and 66 respectively.

The horizontal linkage 102 will include physical stops to prevent motion of the assembly beyond desired ranges. For example, in one embodiment, link 56 is fitted with a physical stop 71 that will prevent clockwise rotation (when viewed from above) of the centerline of link 56 about pivot 54 beyond a line connecting pivots 54 and 66. Likewise, link 62 is fitted with a physical stop 72 that prevents anticlockwise rotation (when viewed from above) of the centerline of link 62 beyond a line connecting pivots 54 and 66. The total range of motion of the links 56 and 62 is thereby constrained to a total of approximately 180 degrees, or approximately 90 degrees to either side of the intermediate bracket 53.

Intermediate bracket pivots 54 and 66 are separated by a horizontal distance D10 approximately equal to the horizontal distance D11 separating outboard bracket pivots 57 and 61. More preferably, the two horizontal distances are equal. As such, when links 56 and 62 are assembled to intermediate bracket 53 and outboard bracket 59 by way of pivots 54, 66, 57, and 61, outboard bracket 59 is constrained to remain parallel to the plane in which pivots 54 and 66 lie, but is permitted to rotate relative to one another within the aforementioned 180 degree constraint.

As one can see from the foregoing discussion, outboard bracket 59 is constrained to be parallel to the plane described by pivots 51 and 68. Clevis 50 and 69 are rigidly affixed to the host vehicle 70 chassis, therefore the outboard bracket 59 can be relocated relative to the vehicle 70 chassis but is constrained in height, yaw, pitch and roll directions relative to the chassis.

The clevis 50 and 69 and associated pivots 51 and 68 should be of sufficient strength to support the entire re-locatable operator station system of brackets, linkages, and pivots. Forces that must be resisted include the weight of the links, operator control station, any force applied by the operator, and forces caused by contact with the operating environment. Since the links 52 and 67 are parallel to each other, both shear and moment produced by the aforementioned loads are resisted by the pivots 51 and 68.

Figure 7A:
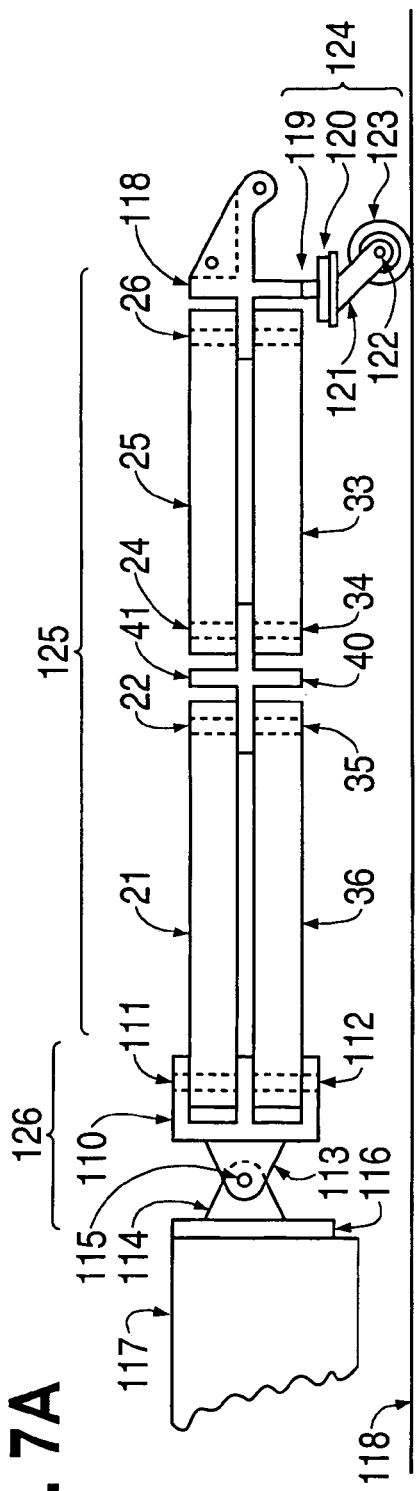
FIGS. 7A and 7B show a detail of a third embodiment of the present invention.
Figure 7B:
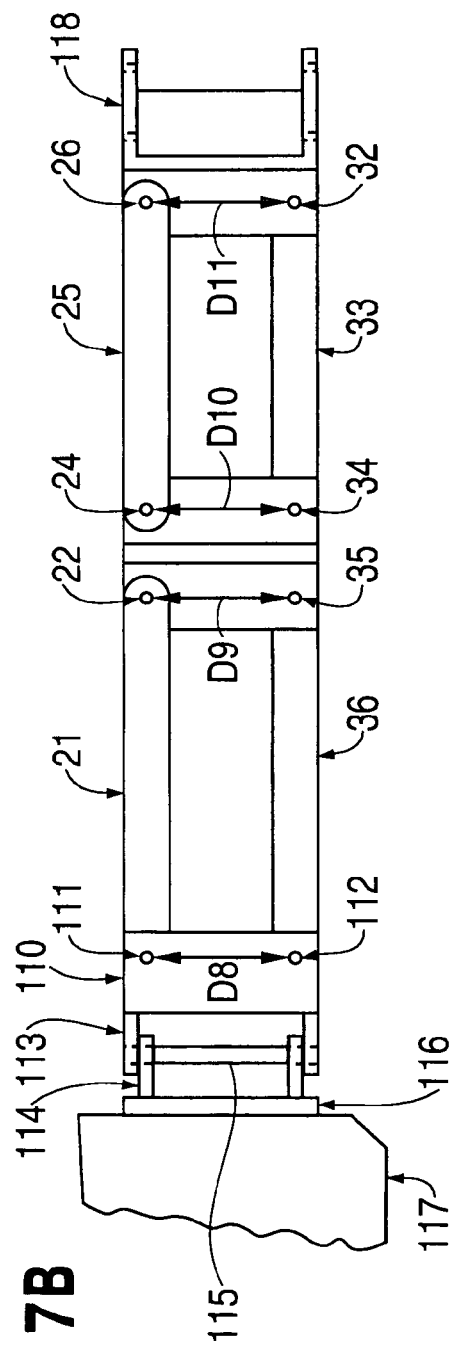

FIG. 7A and FIG. 7B depicts another embodiment of the invention that differs in the way the horizontal linkage assembly 125 connects to the host vehicle 117 and in how the horizontal linkage assembly 125 is supported. In this embodiment, the horizontal linkage assembly 125 couples to and interfaces with the host vehicle 117 via a hinged bracket assembly 126. The hinged bracket assembly comprises a bracket 116 that is connected to the host vehicle 117 via bolts, welds, adhesives, or other appropriate means (not shown). Bracket 116 is fitted with clevis 114 that engages the inboard bracket 110 by way of round pin 115 and clevis 113. This arrangement enables the entire horizontal linkage 125 to rotate about a horizontal axis coincident with the centerline of round pin 115. Links 21 and 36 are rotatably connected to inboard bracket 110 at vertically oriented pivots 111 and 112.

The rest of the horizontal linkage assembly 125 is similar to the aforementioned descriptions of the horizontal linkage assembly, with the exception of the outboard bracket 118. The outboard bracket 118 is fitted with a mounting interface 119 arranged to accept a caster wheel assembly 124. The caster wheel assembly 124 consists of a vertical bearing 120 that enables the wheel 123 to flag about a vertical axis centered on the bearing 120. The lower part of the bearing 120 is connected to the wheel 123 by suitable bracketry 121 and axle 122. As the operator maneuvers the host machine 117, the caster wheel 124 will automatically orient itself to follow its motion.

The horizontal linkage assembly 125 is supported and constrained in longitudinal, lateral, and vertical directions at the inboard end by the above described hinged bracket assembly 126. This hinge assembly 126 also supports and constrains the inboard bracket 110 in yaw and roll. The horizontal linkage assembly 125 is permitted to pitch up or down about pin 115. The outboard bracket 118 is supported by the caster wheel 124 which rests on the running surface 118.

When the host machine 117 is operated over an uneven surface 118, the operator interface will remain at a constant height over the surface where the caster wheel 124 makes contact. This embodiment enables a vehicle 117 to transition from level surfaces to an incline while the operator interface horizontal linkage assembly 125 is fully extended without binding or dragging on the running surface. This embodiment of the invention also enables the invention to remain at a constant height above a surface 118 when transitioning from an incline to level or declined running surface.

Figure 8:
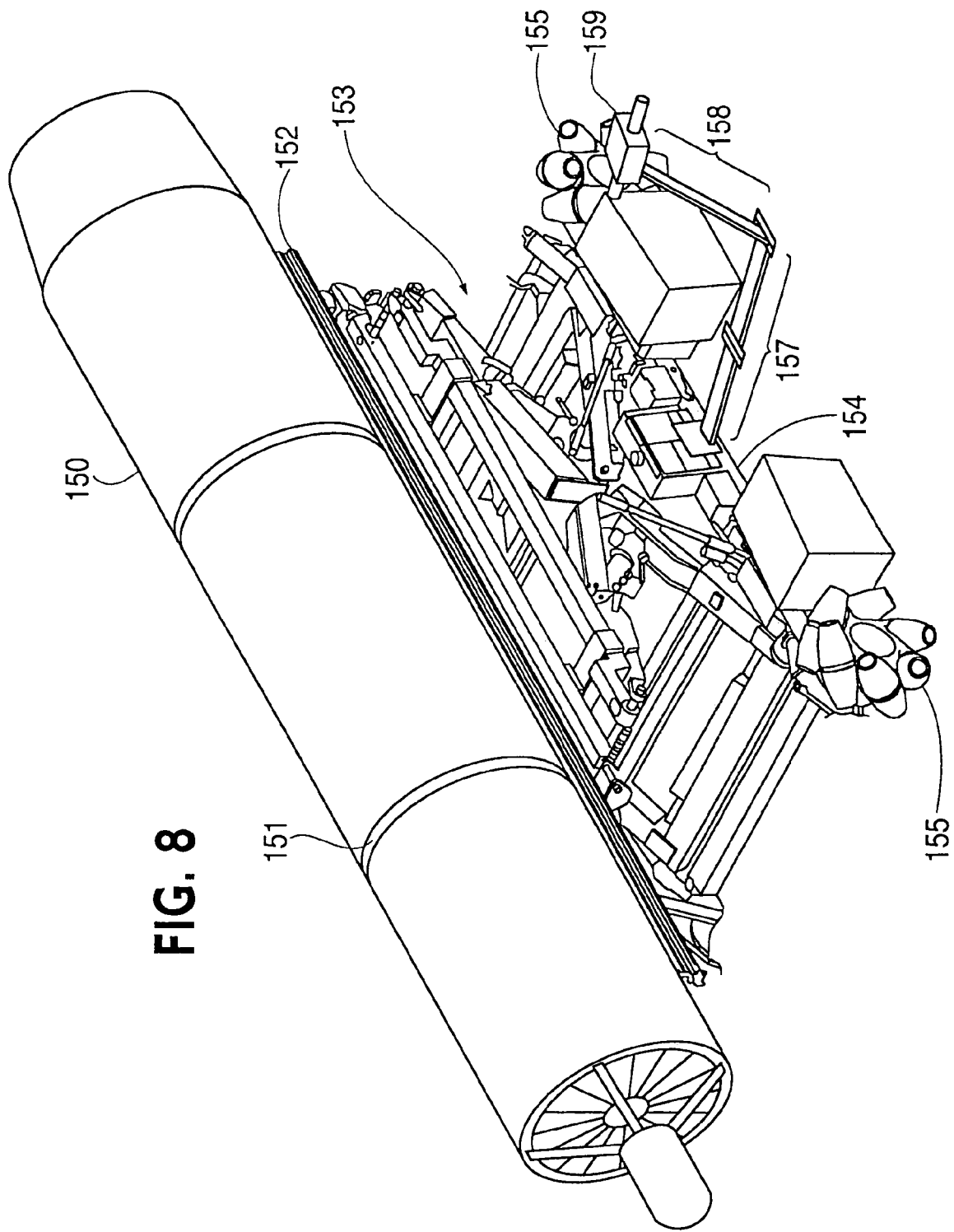
FIG. 8 shows an embodiment of the invention used with an aircraft engine handling machine.

Now referring to FIG. 8, the re-locatable operator station is shown employed on an aircraft jet engine handler. This figure shows a jet engine 150 supported by brackets 151 that interface with parallel rails 152. The parallel rails 152 are in turn supported by a lifting mechanism 153. The lifting mechanism is connected to a chassis 154. Power to lift and lower the engine 150 via the lifting mechanism 153 can be provided manually, by battery powered hydraulics, or by other suitable means. The chassis 154 is depicted as being supported over the running surface by four omni-directional wheels 155.

The re-locatable operator station horizontal linkage assembly 117 157 is shown as being mounted to the side of the engine handler chassis 114154. In another embodiment, the re-locatable operator station horizontal linkage assembly 117 157 is mounted to the front or rear of the chassis 1154 or to a side. The vertical linkage assembly 158 is mounted to the outboard end of the horizontal linkage assembly 157. The operator control station 159 is in turn mounted on top of the vertical linkage assembly 158. In this configuration, an operator can maneuver the engine handler laterally to position it underneath an aircraft (not shown) for engine installation or removal. The ability to relocate the operator station enables the operator to get a close-up view of one or another end of the assembly as it is being maneuvered, while receiving intuitive and tactile feedback on the machine's orientation, longitudinal and transverse velocity, and yaw rate. The operator's station can be relocated when maneuvering amongst the aircraft's landing gear, weapons, sensor pods, or fuel tanks. The vertical linkage assembly 158 can be lowered to pass beneath the aircraft.

Figure 9:
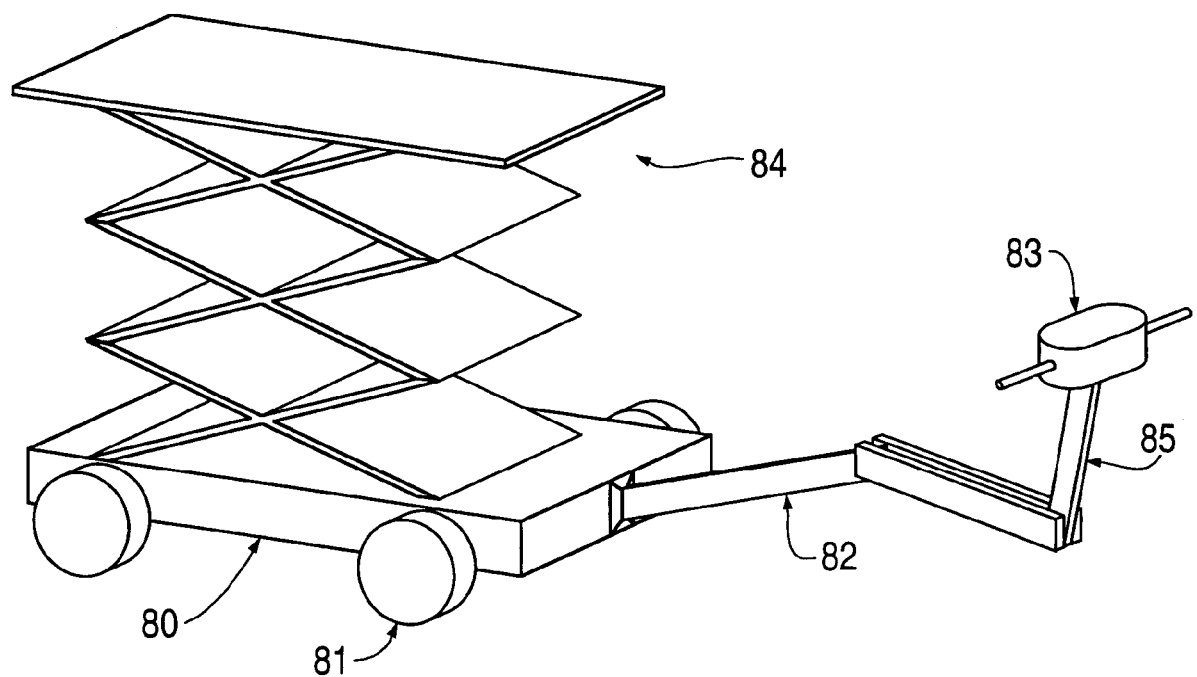
FIG. 9 depicts a scissors lift equipped with an embodiment of the invention.

Now referring to FIG. 9, the re-locatable operator station is shown employed to control an aerial work platform. This embodiment comprises a mobile aerial work platform chassis 80 supported by wheels 81. The horizontal linkage 82 is connected to the aerial work platform's chassis 80 by suitable structure such as bolts, welds, adhesives, or other means (not shown). The vertical linkage assembly 85 is connected to the horizontal linkage assembly 82 as described above. The operator control station 83 is mounted atop the vertical linkage assembly 85 as described earlier. In use, an operator (not shown) would be able to move the operator control station 83 to a position directly behind the chassis 80 while maneuvering through a narrow passageway. The operator could then relocate the operator control station 83 to the left of the chassis 80 by simply applying manual force. The operator can then view the work platform 84 from the side, which would be beneficial when positioning the platform near an overhead obstruction. Alternatively, the operator can collapse the horizontal linkage and thereby position the operator control station 83 directly behind the chassis 80 to present a minimum footprint while maneuvering or during storage.

Now referring to FIGS. 10A and 10B, the re-locatable operator station is employed to control an omni-directional long load transporter. The transporter chassis 91 is supported by four omni-directional wheels 92, in FIG. 10B. Each omni-directional wheel 92 is similar to those disclosed in U.S. Pat. Nos. 6,340,065, 3,876,255, and/or 5,374,879. In each case, the omni-directional wheel 92 comprises a frame rotateably connected to the chassis 91. The frame supports free spinning rollers which contact the running surface. Each omni-directional wheel 92 is driven by machinery (not shown) in such a manner as to enable the entire vehicle to move in any direction desired by and under the operator's control. The horizontal linkage 93 is connected to the long load transporter chassis 91 by suitable structure, such as bolts, welds, adhesives, or other means (not shown). The vertical linkage assembly 94 is connected to the horizontal linkage assembly 93 as described above. The operator control station 95 is mounted atop the vertical linkage as described above. In this embodiment, an operator can position himself behind and in line with the chassis 91 and long load 90. When transporting a shorter load, the operator can partially collapse the horizontal linkage assembly 93 such that the overall length is minimized. When negotiating around blind corners, an operator can position the controls to the outside of the turn by simply pushing the operator station 95 to the desired position. The operator can then position himself to view the machine and its payload 90 around the blind corner while simultaneously maneuvering the machine. The operator control station 95 will remain in the same orientation in yaw, and the operator's intuitive understanding of the relationship between velocity commands and vehicle motion is unchanged. The operator maintains his grip on the operator control and so all machine motion is conveyed to the operator via tactile feedback. FIG. 10A illustrates an alternative embodiment of the long load transporter where the wheels 96 are conventional wheels that are steerable.

Figure 11:
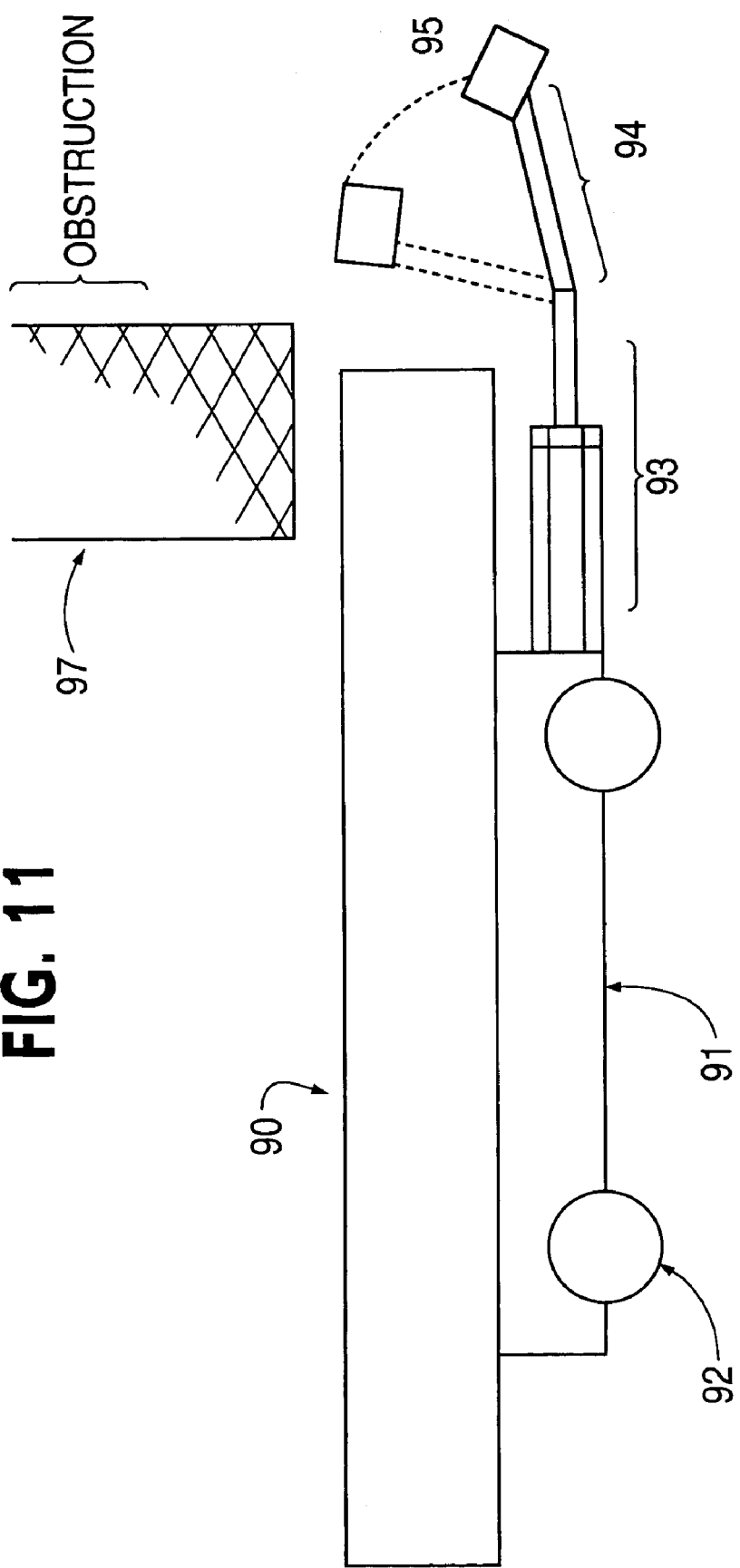
FIG. 11 depicts a long load transporter equipped with an embodiment of the invention negotiating an overhead obstruction.

Now referring to FIG. 11, the above described omni-directional long load transporter, comprising a chassis 91, omni-directional wheels 92, and payload 90, is shown being maneuvered under an overhead obstruction 97. In this case, the horizontal linkage 93 is arranged to place the operator control station 95 behind and in line with the payload 90. The vertical linkage assembly 94 has been lowered by the operator to pass beneath the obstruction 97. One can see from this depiction that the operator control station could similarly be lowered to pass beneath the payload 90 when and if such is necessary.

Figure 12:
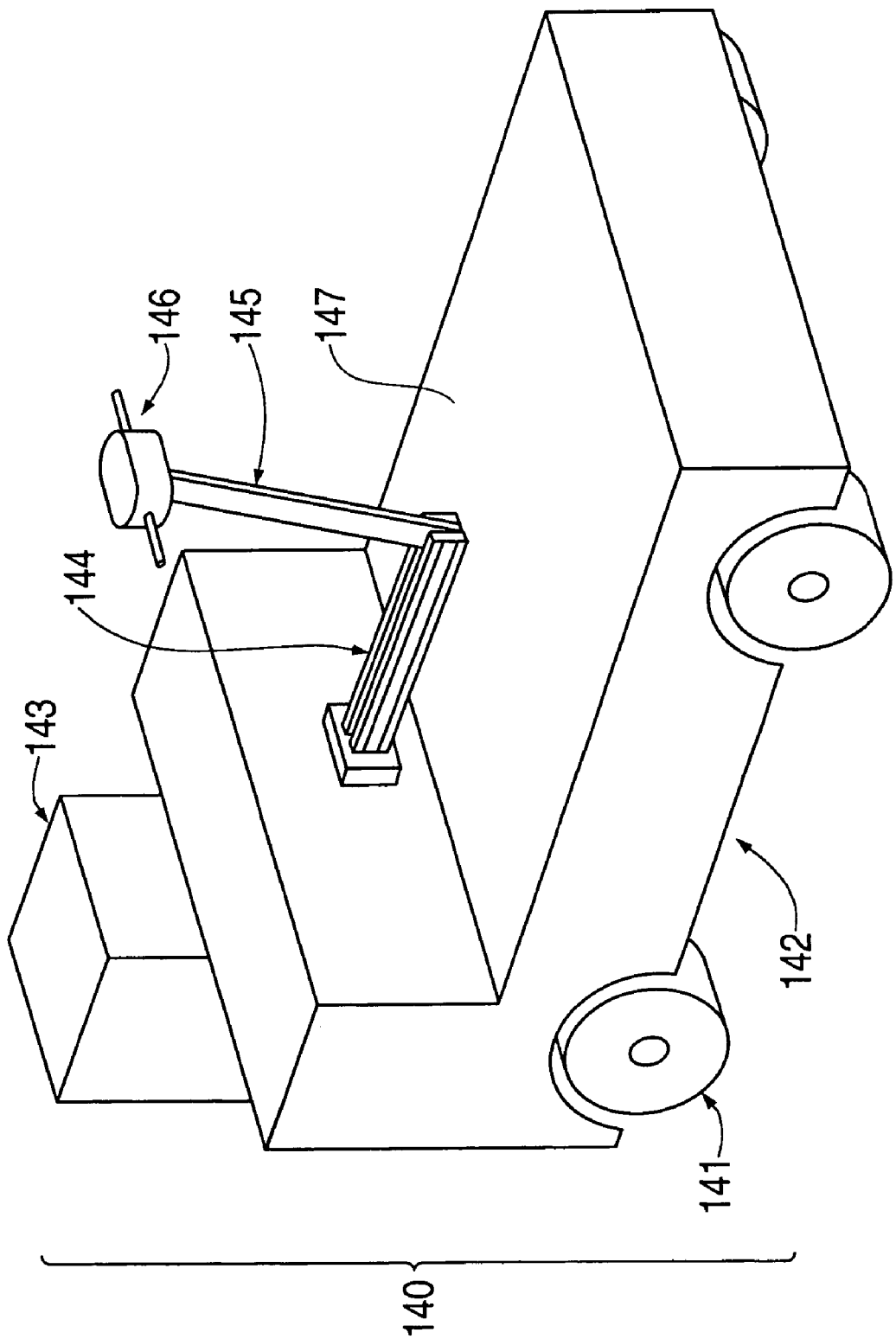
FIG. 12 depicts a ride on machine equipped with an embodiment of the invention.

FIG. 12 contains an embodiment of the invention used in a ride-on machine. In this embodiment the host machine 140 chassis 142 is supported by one or more wheels 141 and powered by machinery (not shown). The chassis provides a riding platform 147 and supports mission hardware 143. The mission hardware 143 could take the form of material handling mechanisms such as lift forks, robotic arms, grippers, scissors lift, large roll handling, die or forge manipulator, or spool handling; construction devices such as a front loading shovel, back hoe, steam roller, auger, pile driver, directional drill, hammer drill, penetrometer, or jackhammer; military equipment such as a mine flail, obstacle breeching device, cannon, mortar, or flamethrower; or agricultural equipment such as combine, plough, rake, or tiller. The mission hardware 143 may require that the operator (not shown) be able to alternately view its function from either side of the machine 140. The horizontal linkage assembly 144 is affixed to the chassis 142. The vertical linkage assembly 145 is connected to the horizontal linkage 144. The operator control station 146 is affixed to the top of the vertical linkage assembly 145.

In this embodiment, an operator (not shown) can control a ride on machine 140, such as by standing on a platform 147, while simultaneously retaining the ability to move from one side of the machine 140 to the other. The ability to move about on platform 147 by repositioning the operator station 146 enables an operator to visually observe the operation of the mission hardware 143 while maintaining control over the machine 140 and mission hardware 143.

This embodiment shows only a single stage horizontal linkage assembly 144. A person skilled in the arts associated with this patent will see that a single stage horizontal linkage assembly will function similarly to the aforementioned two stage linkage assemblies, except that the outboard bracket will be constrained to a semi circular arc centered on the inboard bracket. However, it is envisioned that ride-on vehicle applications may also employ two- and three-stage horizontal linkage assemblies if suitable for the vehicle's mission.

Figure 13:
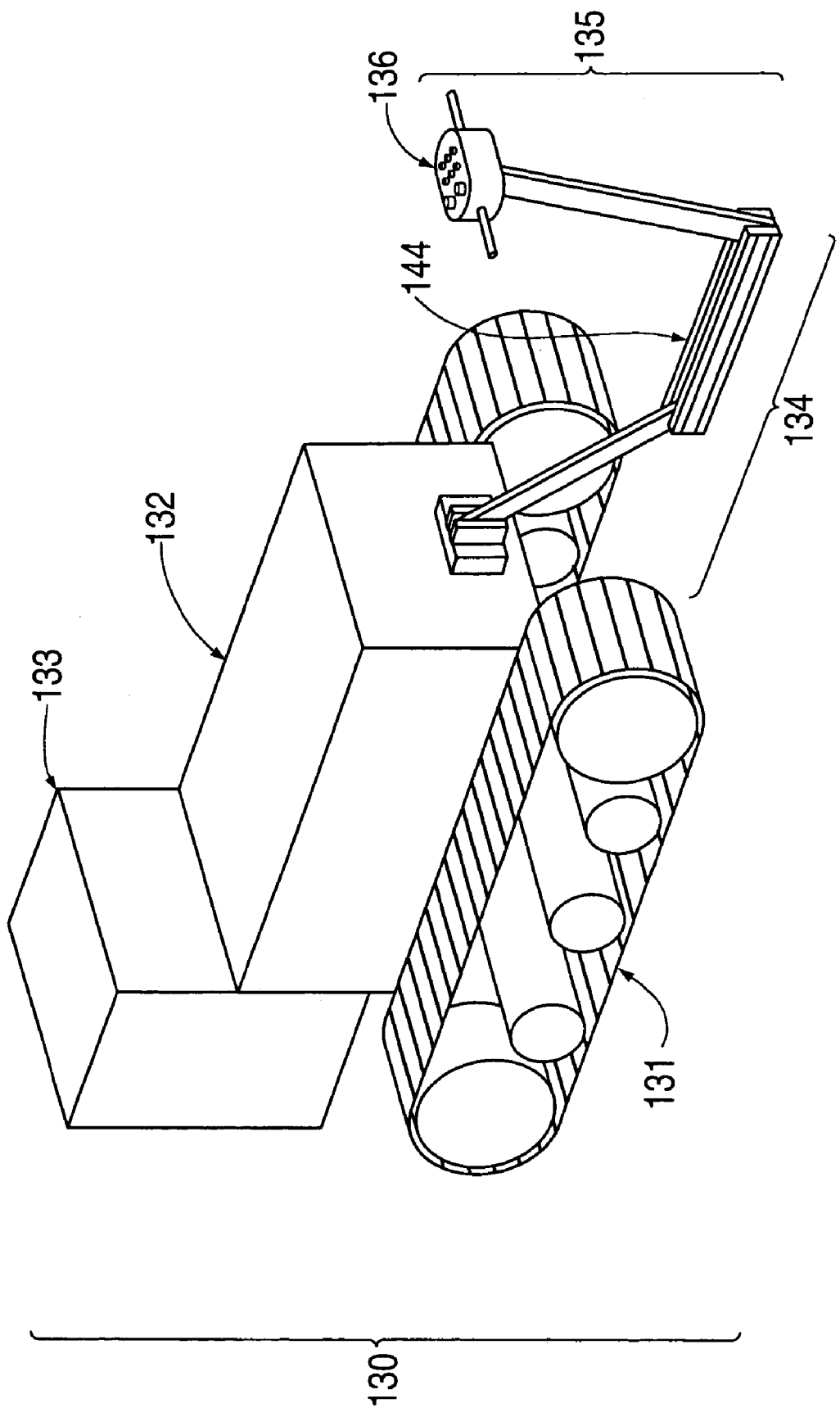
FIG. 13 depicts a tracked machine equipped with an embodiment of the invention.

FIG. 13 illustrates an embodiment of the invention used to support an operator's control station for a tracked machine 130. In this embodiment. the host machine 130 chassis 132 is supported by one or more tracks 131 and powered by machinery (not shown). The chassis further supports mission hardware 133. Mission hardware 133 could take the form of material handling mechanisms such as lift forks, robotic arms, grippers, scissors lift, large roll handling, die or forge manipulator, or spool handling; construction devices such as a front loading shovel, back hoe, steam roller, auger, pile driver, directional drill, hammer drill, penetrometer, or jackhammer; military equipment such as a mine flail, obstacle breeching device, cannon, mortar, or flamethrower; or agricultural equipment such as a combine, plough, rake, or tiller. The mission hardware 133 may require that the operator (not shown) be able to alternately view its function from either side of the tracked machine 130. The horizontal linkage assembly 134 is affixed to the chassis 132. The vertical linkage assembly 135 is connected to the horizontal linkage assembly 134. The operator control station 136 is affixed to the top of the vertical linkage assembly 135.

In this embodiment, an operator (not shown) can control a walk behind tracked machine 130 while simultaneously retaining the ability to move from one side of the machine 130 to the other to visually observe the operation of the mission hardware 133, all the while maintaining control over the machine 130 and mission hardware 133.

The stages and operator interface are configured to enable relocation by the operator at will by simply applying manual force to the operator interface. In operation, the operator will normally walk behind the machine being controlled. The operator will have a clear view of the machine, payload, and any mission hardware, but will be able to view the far side. Without the benefit of the present invention, a machine operator may require a second person to serve as a spotter to assist in guiding the machine through a constricted passageway or in close proximity to other marked machines or fixed obstacles. The present invention enables the operator to rapidly and simply move to other locations around the vehicle while remaining in direct physical contact with the machine. Unique features of the present invention also enable an operator to move about a functioning machine as described above while maintaining an azimuthally similar relationship between the operator interface and the machine's centerline. This may be an important benefit when controlling a vehicle that is capable of omni-directional motion.

The various embodiments of the present invention described herein enable an operator to readily and continually reposition the operator's interface location with respect to the vehicle. This enables walk-behind operation from different vantage points that permit viewing the vehicle and its payload as it is maneuvered. This is of particular use when maneuvering in constrained spaces while handling large objects with protruding features that can be damaged by slight contact with obstacles.

Another advantage of the present invention is the enabled ability to operate a machine in a walk behind manner with the operator receiving tactile feedback on the machine's longitudinal, transverse, and rotational motion.

Another advantage of the present invention is the reduction in risk to the operator of being inadvertently pinned and injured between the operator interface and an obstruction while backing up, since the linkage will retract easily with only slight force.

Another advantage of the present invention is the ability to raise the operator interface to differing heights to permit operators of different statures to operate a walk behind machine with correct ergonomics.

Yet another advantage of the present invention is the ability to lower the operator interface to enable a machine, payload, and operator to be driven underneath obstructions, while the interface is arranged to preserve the best possible ergonomics while doing so.

Still another advantage of the present invention is the ability to collapse the operator interface into a small length, and so reduce the floor space required for storing the machine to a minimum.

Another advantage of the invention is the ability to extend or reposition the operator interface to accommodate long or otherwise oversized loads that extend beyond the vehicle's perimeter.

While various embodiments of the present invention have been described above and in the drawings, it should be understood that they have been presented only as examples, and not as limitations. The breadth and scope of the present invention should not be limited by any of the above-described exemplary embodiments, but should be defined only in accordance with the following claims and their equivalents.

What is claimed is:

1. A re-locatable operator station assembly for use in operating a machine, comprising:
    a first linkage assembly comprising first and second links configured to be rotateably coupled to a machine via first and second pivots;
    a first intermediate bracket comprising third, fourth, fifth and sixth pivots and rotateably coupled to said first linkage assembly via said third and fourth pivots;
    a second linkage assembly comprising third and fourth links and coupled to said first intermediate bracket via said fifth and sixth pivots; and
    an operator station comprising a housing and a man-machine interface and coupled to said second linkage assembly via seventh and eighth pivots.

2. A re-locatable operator station assembly according to claim 1, wherein said operator station is coupled to said second linkage assembly by a second bracket, said second bracket comprising pivots rotateably coupled to the said third and fourth links.

3. A re-locatable operator station assembly according to claim 1, further comprising a third linkage assembly comprising fifth and sixth links and a third bracket comprising seventh, eighth, ninth and tenth pivots, wherein said first and second links of said first linkage assembly are rotateably coupled to said third bracket by said seventh and eighth pivots respectively, said fifth and sixth links of said third linkage assembly are rotateably coupled to said third bracket by said ninth and tenth pivots respectively, and said ninth and tenth links are configured to be rotateably coupled to said machine.

4. A re-locatable operator station assembly according to claim 1, wherein:
    said first and second pivots are separated by a distance that is approximately equal to a distance separating said third and fourth pivots;
    said fifth and sixth pivots are separated by a distance that is approximately equal to a distance separating said seventh and eighth pivots,
    said first and second links are of approximately equal lengths, and
    said third and fourth links are of approximately equal lengths.

5. A re-locatable operator station assembly according to claim 1, wherein said first linkage assembly is oriented substantially horizontally and said fifth and sixth pivots are oriented such that said second linkage assembly may be positioned in a non-horizontal orientation when rotated about said fifth and sixth pivots.

6. A re-locatable operator station assembly according to claim 1, wherein said operator station comprises an electrical cable capable of electronically coupling said operator station to said machine.

7. A re-locatable operator station assembly according to claim 1, wherein 1said operator station comprises a wireless link capable of passing information between said operator station and said machine.

8. A re-locatable operator station assembly according to claim 1, further comprising a seventh link coupled between said third and fourth links so as to prevent rotation of said second linkage assembly with respect to said first bracket, said seventh link comprising a first member and a second member coupled together so as to permit the said seventh link to have a variable length, and a locking mechanism capable of locking the positions of said first and second members so as to fix the length of said seventh link.

9. A re-locatable operator station assembly according to claim 2, further comprising a fourth bracket comprising said first and second pivot, said fourth bracket being capable of coupling said third linkage assembly to said machine.

10. A re-locatable operator station assembly according to claim 1, wherein said pivots further comprise a friction element capable of resisting rotation when subjected to a rotational force below a threshold and permitting rotation when subjected to a rotational force at or above a threshold.

11. A re-locatable operator station assembly according to claim 1, wherein said operator station is coupled to said second linkage assembly by a second bracket, said second bracket comprising said fifth and sixth pivots rotateably coupled to said third and fourth links, respectively.

12. A re-locatable operator station assembly according to claim 1, further comprising a third linkage assembly comprising fifth and sixth links and a third bracket comprising seventh, eighth, ninth and tenth pivots, wherein said first and second links of said first linkage assembly are rotateably coupled to said third bracket by said seventh and eighth pivots respectively, said fifth and sixth links of said third linkage assembly are rotateably coupled to said third bracket by said ninth and tenth pivots respectively, and said ninth and tenth links are configured to be rotateably coupled to said machine.

13. A re-locatable operator station assembly according to claim 1, wherein:
said first and second pivots are separated by a distance that is approximately equal to a distance separating said third and fourth pivots;
said fifth and sixth pivots are separated by a distance that is approximately equal to a distance separating said seventh and eighth pivots,
said first and second links are of approximately equal lengths, and
said third and fourth links are of approximately equal lengths.

14. A re-locatable operator station assembly according to claim 1, wherein said first linkage assembly is oriented substantially horizontally and said fifth and sixth pivots are oriented such that said second linkage assembly may be positioned in a non-horizontal orientation when rotated about said fifth and sixth pivots.

15. A re-locatable operator station assembly according to claim 1, wherein said operator station comprises an electrical cable capable of electronically coupling said operator station to said machine.

16. A re-locatable operator station assembly according to claim 1, wherein said operator station comprises a wireless link capable of passing information between said operator station and said machine.

17. A re-locatable operator station assembly according to claim 2, further comprising a seventh link coupled between said third and fourth links so as to prevent rotation of said second linkage assembly with respect to said first bracket, said seventh link comprising a first member and a second member coupled together so as to permit said seventh link to have a variable length, and a locking mechanism capable of locking the positions of said first and second members so as to fix the length of said seventh link.

18. A re-locatable operator station assembly according to claim 2, further comprising a fourth bracket comprising said first and second pivot, said fourth bracket being capable of coupling said third linkage assembly to said machine.

19. A re-locatable operator station assembly according to claim 1, wherein said pivots further comprise a friction element capable of resisting rotation when subjected to a rotational force below a threshold and permitting rotation when subjected to a rotational force at or above a threshold.

20. A re-locatable operator station assembly according to claim 19, further comprising a means for rotating said operator control station to maintain an ergonomically desirable orientation to an operator depending upon a vertical position of said operator control station.

21. A machine, comprising:
a chassis;
a wheel rotateably mounted to said chassis, said wheel being selected from the group of pneumatic, solid rubber, solid urethane, and omni directional;
mission hardware coupled to said chassis, said mission hardware being selected from the group of lifting machinery, scissors lift, aerial work platform, aircraft engine and handling machinery, and long load support; and
a re-locatable operator station assembly for use in operating said machine, comprising:
a first linkage assembly comprising first and second links configured to be rotateably coupled to said machine via first and second pivots;
a first intermediate bracket comprising third, fourth, fifth and sixth pivots and rotateably coupled to said first linkage assembly via said third and fourth pivot;
a second linkage assembly comprising third and fourth links and coupled to said first intermediate bracket via said fifth and sixth pivots; and
an operator station comprising a housing and a man-machine interface and coupled to said second linkage assembly via seventh and eighth pivots.

* * * * *